United States Patent Office 3,810,910
Patented May 14, 1974

3,810,910
1-ALKOXY- OR 1-ALKYLTHIO-CARBONYL-2-
THIENYL-(2')-BENZIMIDAZOLES
Friedrich J. Meyer, deceased, late of Wuppertal, Germany, by Ilse Frieda Anna Meyer, heiress, Wuppertal, and Helmut Kaspers and Hans Scheinpflug, Leverkusen, Germany, assignors to Bayer Aktiengesellschaft, Leverkusen, Germany
No Drawing. Filed Dec. 27, 1972, Ser. No. 318,964
Claims priority, application Germany, Jan. 11, 1972,
P 22 01 062.4
Int. Cl. C07d 49/38
U.S. Cl. 260—309.2                    9 Claims

ABSTRACT OF THE DISCLOSURE 1-alkoxy- or 1 - alkylthio-carbonyl-2-thienyl-(2')-benzimidazoles of the formula

[Structure: benzimidazole fused with thienyl, with O=C—X—R substituent on N]
                                                    (I)

in which $X^1$ and $X^2$ each independently is hydrogen, halogen or methyl,
X is oxygen or sulfur, and
R is alkyl, which possess fungicidal properties.

1-alkoxy- or 1 - alkylthio-carbonyl-2-thienyl-(2')-benzimidazoles of the formula

[Structure: benzimidazole fused with thienyl, with O=C—X—R substituent on N]
                                                    (I)

in which $X^1$ and $X^2$ each independently is hydrogen, halogen or methyl,
X is oxygen or sulfur, and
R is alkyl, which possess fungicidal properties.

The present invention relates to and has for its objects the provision of particular new 1-alkoxy- or 1-alkylthio-carbonyl-2-thienyl-(2') - benzimidazoles, optionally substituted on the thiophene ring with up to two halogen and/or methyl radicals, which possess fungicidal properties, active compositions in the form of mixtures of such compounds with solid and liquid dispersible carrier vehicles, and methods for producing such compounds in a new way, especially for combatting fungi, with other and further objects becoming apparent from a study of the within specification and accompanying examples.

It is known from German DOS 1,209,799 that 2-(2'-furyl)-benzimidazole (Compound A) has good fungicidal properties. However, its effect is limited, particularly at relatively low levels of application and concentration, on Fusarium species, soil-borne fungi and fungi which attack the seeds from the soil.

Furthermore, from German Pat. 921,290, it is known that trichloromethylmercapto compounds, in particular N-trichloromethylthiotetrahydrophthalimide (Compound B), can be used as fungicidal active compounds. The effect is, however, not always satisfactory in the case of relatively low concentrations.

The present invention provides N-alkoxycarbonyl- or N-alkylthiocarbonyl-benzimidazoles of the general formula

[Structure: benzimidazole fused with thienyl, with O=C—X—R substituent on N]
                                                    (I)

in which $X^1$ and $X^2$ each independently is hydrogen, halogen or methyl,
X is oxygen or sulfur, and
R is alkyl.

If $X^1$ or $X^2$ is halogen, it is preferably chlorine or bromine. R is preferably straight or branched chain alkyl with 1 to 6 carbon atoms, especially lower alkyl of 1 to 4 carbon atoms.

Surprisingly, the N-alkoxycarbonyl- or N-alkylthiocarbonyl-benzimidazoles according to the invention show a fungitoxic effectiveness with greater breadth of activity than the 2-(2'-furyl)-benzimidazole and N-trichloromethylthiotetrahydrophthalimide known from the prior art which are the closest active compounds of the same type of activity. The active compounds according to the invention therefore represent a genuine enrichment of the art.

The invention also provides a process for the production of a N-alkoxycarbonyl- or N-alkylthiocarbonyl-benzimidazole of Formula I in which a 2-(2'-thienyl)-benzimidazole of the general formula

[Structure: benzimidazole fused with thienyl, N—H]
                                                    (II)

in which $X^1$ and $X^2$ have the meanings stated above, is reacted with a chloroformic acid ester or thiolester of the general formula $$Cl-\overset{O}{\underset{}{C}}-X-R \quad (III)$$

in which

X and R have the meanings stated above, optionally in the presence of an acid-binding agent and optionally in the presence of a diluent.

If 2-(2'-thienyl)-benzimidazole and chloroformic acid ethyl ester are used as starting materials, the reaction course can be represented by the following formula scheme;

[Reaction scheme: (IIa) + Cl—CO—OC$_2$H$_5$ (IIIa) → (3) product (VI) with CO—OC$_2$H$_5$ group, −HCl]

(IIa)            (IIIa)                    (3)        (VI)

The 2-(2'-thienyl)-benzimidazoles which can be used as starting materials are defined generally by the Formula II. As examples thereof there may be mentioned in particular:

2-(2'-thienyl)-benzimidazole,
2-(4',5'-dibromo-thienyl-2')-benzimidazole,
2-(4',5'-dimethyl-thienyl-2')-benzimidazole,
2-(5'-methyl-thienyl-2')-benzimidazole,
2-(4'-methyl-thienyl-2')-benzimidazole,
2-(4',5'-dichloro-thienyl-2')-benzimidazole.

The 2-(2'-thienyl)-benzimidazoles used as starting materials are generally known and can be prepared according to customary methods, for example by reaction of o-phenylenediamine and thiophen-2-carboxylic acid (or its derivatives such as acid halides, nitriles, acid amides, acid esters) in mineral acids, such as sulfuric, phosphoric or halogen hydracids at 120 to 180° C. (cf. U.S. patent specification 3,478,046).

The chloroformic acid esters or thiolesters also used as starting materials are defined generally by the Formula III. As examples thereof there may be mentioned in particular:

chloroformic acid methyl ester,
chlorothioformic acid S-methyl ester,
chloroformic acid ethyl ester,
chlorothioformic acid S-ethyl ester,
chloroformic acid propyl ester,
chlorothioformic acid S-propyl ester,
chloroformic acid isopropyl ester,
chlorothioformic acid S-isopropyl ester,
chloroformic acid butyl ester,
chlorothioformic acid S-butyl ester,
chloroformic acid isobutyl ester,
chlorothioformic acid S-isobutyl ester.

These chloroformic acid esters are known or can be prepared according to customary methods.

As diluent for the reaction according to the invention, all inert organic solvents are suitable. Preferred diluents include hydrocarbons, such as benzene, toluene, nitrobenzene and xylene; ethers, such as dioxane and tetrahydrofuran; chlorinated hydrocarbons, such as methyl choride; nitriles, such as acetonitrile; ketones, such as methyl ethyl ketone; and sulfoxides, such as dimethyl sulfoxide.

As acid-binder, all customary acid-binding agents can be used. Preferred acid-binders include alkali metal carbonates, alkaline earth metal carbonates, and secondary and tertiary organic bases. As particularly suitable examples, there are mentioned sodium carbonate, barium carbonate, pyridine and triethylamine.

The reaction temperatures can be varied within a fairly wide range. In general, the reaction is carried out at —50° C. to +150° C., preferably —10° C. to +80° C.

The reaction is, in general, carried out at normal pressure, but it can also be carried out at increased pressure.

In carrying out the process according to the invention, for each mole of the compound of the Formula II there are generally used about 1–5 moles of the compound of the Formula III and the equivalent amount of acid-binder.

In a special embodiment of the process according to the invention there is used, instead of a separate diluent, an excess of a liquid organic acid-binding agent, preferably a secondary organic base.

To isolate the compounds of the Formula I, any excess of chloroformic acid ester or thiolester may be removed by hydrolysis, and the aqueous phase may be extracted with organic solvent, dried and distilled. The solid residue obtained may be purified by recrystallization.

As new active compounds of Formula I, there are mentioned in particular:

1-methoxycarbonyl-2-thienyl-(2')-benzimidazole,
1-methylthiocarbonyl-2-thienyl-(2')-benzimidazole,
1-methoxycarbonyl-2-(4',5'-dibromo-thienyl-2')-benzimidazole,
1-ethoxycarbonyl-2-thienyl-(2')-benzimidazole,
1-ethylthiocarbonyl-2-thienyl-(2')-benzimidazole,
1-ethoxycarbonyl-2-(4',5'-dibromo-thienyl-2')-benzimidazole,
1-isopropoxycarbonyl-2-thienyl-(2')-benzimidazole,
1-isopropoxycarbonyl-2-(4',5'-dibromo-thienyl-2')-benzimidazole,
1-propoxycarbonyl-2-(5'-methyl-thienyl-2')-benzimidazole,
1-propylthiocarbonyl-2-thienyl-(2')-benzimidazole,
1-butoxycarbonyl-2-thienyl-(2')-benzimidazole,
1-butylthiocarbonyl-2-thienyl-(2')-benzimidazole,
1-tertiary-butoxycarbonyl-2-thienyl-(2')-benzimidazole,
1-secondary-butoxycarbonyl-2-thienyl-(2')-benzimidazole.

The active compounds according to the invention exhibit a strong fungitoxic activity. Because of their low toxicity to warm-blooded animals, they are suitable for the control of undesired fungal growth. Their very good toleration by higher plants permits their use as crop protection agents.

The active compounds are particularly suitable for the control of phytopathogenic fungi on above-the-soil parts of plants, as well as of those fungi which attack the plants from the soil.

The active compounds exhibit a particularly high fungicidal potency against powdery mildew fungi from the family of the Erysiphaceae, for example against fungi from the genera Erysiphe, Oidium and Podosphaere. The active compounds can, however, also be used with good results for the control of other phytopathogenic fungi, for example against fungi which cause diseases in rice and ornamental plants. The active compounds show, among other things, a good activity against *Piricularia oryzae, Pellicularia saskii* and *Cochliobolus miyabeanus*, three pathogenic agents which occur in rice. Furthermore, the growth of *Tilletia caries* and *Fusarium nivale* is also inhibited. Additionally, a noteworthy curative effect against *Venturia inaequalis* is present.

The active compounds are distinguished by a high effectiveness in vary low concentrations and by a particularly high plant-compatibility. Inadvertent overdosages can readily be accepted.

The active compounds according to the instant invention can be utilized, if desired, in the form of the usual formulations or compositions with conventional inert (i.e. plant compatible or herbicidally inert) pesticide diluents or extenders, i.e. diluents, carriers or extenders of the type usable in conventional pesticide formulations or compositions, e.g. conventional pesticide dispersible carrier vehicles such as gases, solutions, emulsions, suspensions, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g. conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: aerosol propellants which are gaseous at normal temperatures and pressures, such as Freon; inert dispersible liquid diluent carriers, including inert organic solvents, such as aromatic hydrocarbons (e.g. benzene, toluene, xylene, alkyl naphthalenes, etc.), halogenated, especially chlorinated, aromatic hydrocarbons (e.g. chlorobenzenes, etc.), cycloalkanes (e.g. cyclohexane, etc.), paraffins (e.g. petroleum or mineral oil fractions), chlorinated aliphatic hydrocarbons (e.g. methylene chloride, chloroethylenes, etc.), alcohols (e.g. methanol, ethanol, propanol, butanol, glycol, etc.) as well as ethers and esters thereof (e.g. glycol monomethyl ether, etc.), amines (e.g. ethanolamine, etc.), amides (e.g. dimethyl formamide, etc.), sulfoxides (e.g. dimethyl sulfoxide, etc.), acetonitrile ketones (e.g. actone, methyl ethyl ketone, methyl isobutyl ketone, cyclohexanone, etc.), and/or water; as well as inert dispersible finely divided solid carriers, such as ground natural minerals (e.g. kaolins, clays, alumina, silica, chalk, i.e. calcium carbonate, talc, attapulgite, montmorillonite, kieselguhr, etc.) and ground synthetic minerals (e.g. highly dispersed silicic acid, silicates (e.g. alkali silicates, etc.); whereas the following may be chiefly considered for use as conventional carrier vehicle assistants, e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfates, alkyl sulfonates, aryl sulfonates, albumin hydrolyzates, etc., and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other fungicides, or insecticides, acaricides, rodenticides, bactericides, namatocides, herbicides, fertilizers, growth-regulating agents, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95% by weight, and preferably 0.5–90% by weight, of the mixture, whereas carrier composition mixtures suitable for direct application or field application generally contemplate those in which the active compound is present in an amount substantially between about 0.0001–2%, preferably 0.001–1%, by weight of the mixture. Thus, the present invention contemplates over-all compositions which comprises mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.0001–95%, and preferably 0.01–95%, by weight of the mixture.

The active compounds can also be used in accordance with the well-known ultra-low-volume process with good success, i.e. by applying such compound if normally a liquid, or by applying a liquid composition containing the same, via very effective atomizing equipment, in finely divided form, e.g. average particle diameter of from 50–100 microns, or even less, i.e. mist form, for example by airplane crop spraying techniques. Only up to at most about a few liters/hectare are needed, and often amounts only up to about 15 to 1000 g./hectare, preferably 40 to 600 g./hectare, are sufficient. In this process it is possible to use highly concentrated liquid compositions with said liquid carrier vehicles containing from about 20 to about 60 or even 80% by weight of the active compound or even the 100% active substance alone, e.g. about 10–100% by weight of the active compound.

Furthermore, the present invention contemplates methods of selectively killing, combating or controlling fungi, which comprises applying to at least one of correspondingly (a) such fungi, and (b) the corresponding habitat thereof, i.e. the locus to be protected, a correspondingly combative or toxic amount, i.e. fungicidally effective amount, of the particular active compound of the invention alone or together with a carrier vehicle as noted above. The instant formulations or compositions are applied in the usual manner, for instance by spraying, atomizing, vaporizing, scattering, dusting, watering, squirting, sprinkling, pouring, fumigating, and the like.

It will be realized, of course, that the concentration of the particular active compound utilized in admixture with the carrier vehicle will depend upon the intended application. Therefore, in special cases it is possible to go above or below the aforementioned concentration ranges.

The synthesis, unexpected superiority and outstanding activity of the particular new compounds of the present invention are illustrated, without limitation, by the following examples.

EXAMPLE 1

Podosphaera test (powdery mildew of apples) [protective]

Solvent: 4.7 parts by weight acetone
Emulsifier: 0.3 part by weight alkylarylpolyglycol ether
Water: 95 parts by weight.

The amount of active compound required for the desired concentration of the active compound in the spray liquid was mixed with the stated amount of solvent, and the concentrate was diluted with the stated amount of water which contained the stated addition.

Young apple seedlings in the 4–6 leaf stage were sprayed with the spray liquid until dripping wet. The plants remained in a greenhouse for 24 hours at 20° C. and at a relative atmospheric humidity of 70%. They were then inoculated by dusting with conidia of the apple powdery mildew causative organism (*Podosphaera leucotricha* Salm.) and placed in a greenhouse at a temperature of 21–23° C. and at a relative atmospheric humidity of about 70%.

Ten days after the inoculation, the infection of the seedlings was determined as a percentage of the untreated but also inoculated control plants.

0% means no infection; 100% means that the infection was exactly as great as in the case of the control plants.

The active compounds, the concentration of the active compounds and the results can be seen from the following Table 1.

TABLE 1
[Podosphaera test/Protective]

| Active compounds | Infection as a percentage of the infection of the untreated control with a concentration of active compound (in percent by weight) of— | | | |
|---|---|---|---|---|
| | 0.0062 | 0.00156 | 0.00078 | 0.00039 |
| 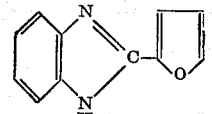 (A) (known) | 6 | 38 | | |
| 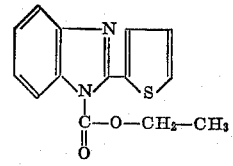 (3) | 0 | 6 | 9 | 47 |
| 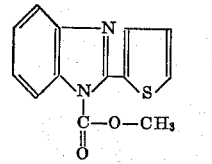 (1) | 0 | 30 | | |

EXAMPLE 2

Fusicladium test (apple scab) [curative]

Solvent: 4.7 parts by weight acetone
Emulsifier: 0.3 part by weight alkylarylpolyglycol ether
Water: 95 parts by weight.

The amount of active compound required for the desired concentration of the active compound in the spray liquid was mixed with the stated amount of solvent, and the concentrate was diluted with the stated amount of water which contained the stated addition.

Young apple seedlings in the 4-6 leaf stage were inoculated with an aqueous conidium suspension of the apple scab caustative organism (*Fusicladium dendriticum* Fuckel) and incubated for 18 hours in a humidity chamber at 18-20° C. and at a relative atmospheric humidity of 100%. The plants then came into a greenhouse. They dried.

After standing for a suitable period of time, the plants were sprayed dripping wet with the spray liquid prepared in the manner described above. The plants then again came into a greenhouse.

15 days after incoulation, the infection of the apple seedlings was determined as a percentage of the untreated but also inoculated control plants.

0% means no infection; 100% means that the infection was exactly as great as in the case of the control plants.

The active compounds, the concentrations of the active compounds, the period of time between inoculation and spraying and the results obtained can be seen from the following Table 2.

TABLE 2
[Fusicladium test/Curative]

| Active compound | Residence period in hours | Infection as a percentage of the infection of the untreated control with a concentration of active compound (in percent by weight) of 0.025% |
|---|---|---|
| (A) (known) | 42 | 15 |
| (1) | 42 | 13 |

EXAMPLE 3

Piricularia and Pellicularia test

Solvent: 1.9 parts by weight dimethyl formamide
Dispersing agent: 0.1 part by weight alkylarylpolyglycol ether
Water: 98 parts by weight
Other additives: — parts by weight.

The amount of active compound required for the desired concentration of active compound in the spray liquor was mixed with the stated amount of the solvent and of the dispersing agent, and the concentrate was diluted with the stated amount of water.

2 batches each consisting of 30 rice plants about 2-4 weeks old were sprayed with the spray liquor until dripping wet. The plants remained in a greenhouse at temperatures of 22 to 24° C. and a relative atmospheric humidity of about 70% until they were dry. One batch of the plants was then inoculated with an aqueous suspension of 100,000 to 200,000 spores/ml. of *Piricularia oryzae* and placed in a chamber at 24 to 26° C. and 100% relative atmospheric humidity. The other batch of the plants was infected with a culture of *Pellicularia sasakii* grown on malt agar and placed at 28 to 30° C. and 100% relative atmospheric humidity.

5 to 8 days after inoculation, the infection of all the leaves present at the time of inoculation with *Piricularia oryzae* was determined as a percentage of the untreated but also inoculated control plants. In the case of the plants infected with *Pellicularia sasakii*, the infection on the leaf sheaths after the same time was also determined in proportion to the untreated but infected control. 0% means no infection; 100% means that the infection was exactly as great as in the case of the control plants.

The active compounds, the concentrations of the active compounds and the results can be seen from the following Table 3.

TABLE 3
[Piricularia (a) and Pellicularia )b) test]

| Active compound | (a) 0.05 | (a) 0.025 | (b) 0.05 | (b) 0.025 |
|---|---|---|---|---|
| (B) (known) | 75 | 100 | 75 | — |
| (3) | 0 | 0 | 0 | 75 |
| (5) | 0 | 0 | 25 | 50 |
| (6) | 25 | — | — | — |

EXAMPLE 4

(a)

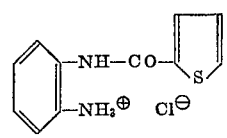

175 g. (1.62 moles) of o-phenylenediamine were dissolved in 4 liters of methylene chloride. To this solution there were added dropwise in 70 minutes, at room temperature, 117 g. (0.8 mole) thiophen-2-carboxylic acid chloride (B.P. 83-84° C./11 mm. Hg); stirring was thereafter effected for 18 hours at room temperature, followed by filtration of the resultant precipitate and washing with methylene chloride. For further purification, the precipitate was extracted with benzene.

180 g. (44.5% of theory) of thienyl-2'-o-phenylenediamine hydrochloride of the melting point 128° C. were obtained.

(b) Preparation of the intermediate product 2-(thienyl-2')-benzimidazole:

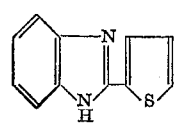

(IIa)

387 g. (1.5 moles) of thenyl-2'-o-phenylenediamine hydrochloride were introduced into 720 ml. (2.8 moles) phosphorus oxychloride within 80 minutes. The temperature rose during this time to 76° C. Stirring was subsequently effected for 3 hours at a temperature of 75–92° C., the reaction mixture was left to stand for 18 hours, and filtration from the 2-(thienyl-2')-benzimidazole hydrochloride formed was effected. The hydrochloride was boiled up with water several times and again filtered, then treated with dilute hydrochloric acid until all had dissolved. From the hydrochloric acid solution the base was precipitated with dilute solution of sodium hydroxide; the precipitate was washed well with water and dried.

246 g. (82% of theory) of 2-thienyl-(2')-benzimidazole of the melting point 336° C. were obtained.

(c)

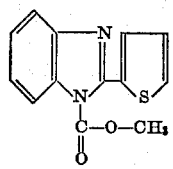

(1)

20 g. (0.1 mole) of 2-(thienyl-2')-benzimidazole (melting point 336° C.) were suspended in 120 ml. pyridine at −5° C., and 10 g. (0.13 mole) chloroformic acid methyl ester were added within one hour. The mixture was stirred for one hour at 0° C., then for 16 hours at room temperature, poured on to ice, hydrochloric acid was added, and extraction with benzene was effected. After the benzene had been distilled off, the residue was recrystallized from ligroin with addition of activated charcoal.

There were obtained 21 g. (88.4% of theory) of 1-methoxycarbonyl-2-thienyl-(2') - benzimidazole of the melting point 74 to 75° C.

EXAMPLES 5–10

In analogous manner, the compounds of the following table were obtained.

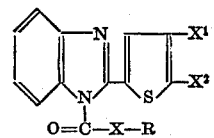

(I)

| Example number | Compound number | X¹ | X² | X | R | Melting point (° C.) |
|---|---|---|---|---|---|---|
| 5 | 2 | Br | Br | O | CH₃ | 161 |
| 6 | 3 | H | H | O | C₂H₅ | 84 |
| 7 | 4 | Br | Br | O | C₂H₅ | 115–118 |
| 8 | 5 | H | H | O | CH(CH₃)₂ | 66 |
| 9 | 6 | Br | Br | O | CH(CH₃)₂ | 145 |
| 10 | 7 | H | H | O | C₄H₉ | 54 |

It will be appreciated that the instant specification and examples are set forth by way of illustration and not limitation, and that various modifications and changes may be made without departing from the spirit and scope of the present invention.

What is claimed is:

1. A 1-alkoxy- or 1-alkylthio-carbonyl-2-thienyl-(2')-benzimidazole of the formula

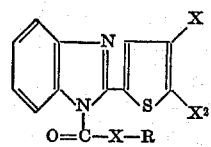

(I)

in which
X¹ and X² each independently is hydrogen, halogen or methyl,

X is oxygen or sulfur, and
R is alkyl of up to 6 carbon atoms.

2. A compound according to claim 1 in which X¹ and X² each independently is hydrogen, chlorine, bromine or methyl, and R is lower alkyl.

3. The compound according to claim 1 wherein such compound is 1-methoxycarbonyl-2-thienyl-(2')-benzimidazole of the formula

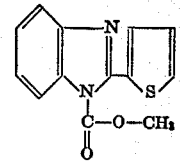

4. The compound according to claim 1 wherein such compound is 1-methoxycarbonyl-2-(4',5'-dibromo-thienyl-2')-benzimidazole of the formula

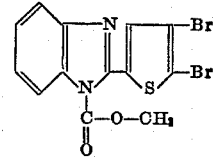

5. The compound according to claim 1 wherein such compound is 1-ethoxycarbonyl-2-thienyl-(2')-benzimidazole of the formula

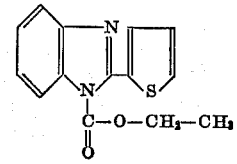

6. The compound according to claim 1 wherein such compound is 1-ethoxycarbonyl-2-(4',5'-dibromo-thienyl-2')-benzimidazole of the formula

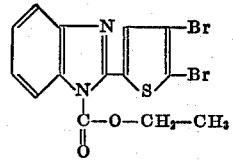

7. The compound according to claim 1 wherein such compound is 1-isopropoxycarbonyl-2-thienyl-(2')-benzimidazole of the formula

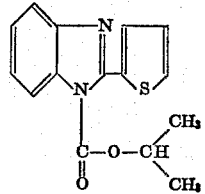

8. The compound according to claim 1 wherein such compound is 1-isopropoxycarbonyl-2-(4',5'-dibromo-thienyl-2')-benzimidazole of the formula

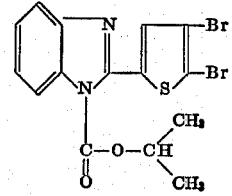

9. The compound according to claim 1 wherein such compound is 1-butoxycarbonyl-2-thienyl-(2')-benzimidazole of the formula
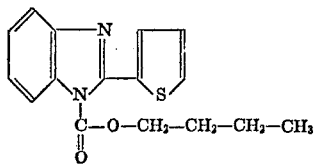
References Cited
UNITED STATES PATENTS
| 3,155,571 | 11/1964 | Sarett et al. | 260—309.2 |
| 3,325,506 | 6/1967 | Jones | 260—309.2 |
| 3,478,046 | 11/1969 | Sarett et al. | 260—309.2 |
| 3,652,580 | 3/1972 | Janiak et al | 260—309.2 |
FOREIGN PATENTS
| 1,450,670 | 7/1966 | France | 260—309.2 |
| 1,117,000 | 11/1961 | Germany | 260—309.2 |
NATALIE TROUSOF, Primary Examiner
U.S. Cl. X.R.
424—273

UNITED STATES PATENT OFFICE
CERTIFICATE OF CORRECTION

Patent No. 3,810,910          Dated May 14, 1974

Inventor(s) Friedrich J. Meyer et al

It is certified that error appears in the above-identified patent and that said Letters Patent are hereby corrected as shown below:

Col. 2, line 51, correct spelling of "chloroformic".

Col. 2, line 61, change "(VI)" to -- (IV) --.

Col. 4, line 18, correct spelling of "Podosphaera".

Col. 4, line 24, correct spelling of "sasakii".

Col. 4, line 30, change "vary" to -- very --.

Col. 5, line 16, correct spelling of "nematocides".

Col. 7, line 11, correct spelling of "inoculation".

Col. 9, line 66 (claim 1), correct formula of Compound (I) to read as follows:

-- 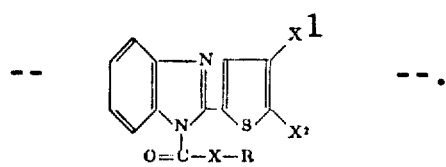 --.

Signed and sealed this 5th day of November 1974.

(SEAL)
Attest:

McCOY M. GIBSON JR.          C. MARSHALL DANN
Attesting Officer          Commissioner of Patents